United States Patent
Schilling et al.

(10) Patent No.: US 9,079,394 B2
(45) Date of Patent: Jul. 14, 2015

(54) APPARATUS USABLE WITH DIFFERENT CIRCUIT BOARD VARIANTS, WITH DETECTION OF CURRENTLY-INSTALLED VARIANT

(71) Applicants: Tilmann Schilling, Berlin (DE); Joachim Jauert, Berlin (DE)

(72) Inventors: Tilmann Schilling, Berlin (DE); Joachim Jauert, Berlin (DE)

(73) Assignee: Francotyp-Postalia GmbH, Birkenwerder (DE)

( * ) Notice: Subject to any disclaimer, the term of this patent is extended or adjusted under 35 U.S.C. 154(b) by 77 days.

(21) Appl. No.: 13/782,282

(22) Filed: Mar. 1, 2013

(65) Prior Publication Data

US 2013/0229451 A1    Sep. 5, 2013

(30) Foreign Application Priority Data

Mar. 2, 2012 (DE) .................... 20 2012 002 510 U

(51) Int. Cl.

| B41J 29/38 | (2006.01) |
|---|---|
| B41J 2/07 | (2006.01) |
| B41J 19/20 | (2006.01) |
| B41J 29/54 | (2006.01) |
| G07B 17/00 | (2006.01) |

(52) U.S. Cl.
CPC B41J 2/07 (2013.01); B41J 19/202 (2013.01); B41J 29/54 (2013.01); G07B 17/00 (2013.01)

(58) Field of Classification Search
CPC ...... B41J 2/0458; B41J 2/04541; B41J 29/38; B41J 2/04543; B41J 29/393
USPC ............................................................ 347/5
See application file for complete search history.

(56) References Cited

U.S. PATENT DOCUMENTS

| 4,515,458 A | * | 5/1985 | Masuda et al. ................... 399/85 |
| 7,033,096 B2 | | 4/2006 | Hetzer et al. |
| 7,940,417 B2 | | 5/2011 | Birkenfeld et al. |
| 8,262,178 B2 | | 9/2012 | Muhl |
| 2005/0134351 A1 | * | 6/2005 | Tamura .......................... 327/278 |
| 2006/0005016 A1 | | 1/2006 | Lee et al. |
| 2007/0193508 A1 | * | 8/2007 | Komatsu ........................ 118/300 |
| 2008/0180473 A1 | | 7/2008 | Gardner et al. |
| 2011/0025377 A1 | * | 2/2011 | Lueger et al. .................... 326/93 |
| 2011/0141258 A1 | * | 6/2011 | Song et al. ........................ 348/77 |
| 2011/0191502 A1 | * | 8/2011 | Zhao ............................... 710/10 |
| 2012/0147071 A1 | | 6/2012 | Ortmann et al. |

FOREIGN PATENT DOCUMENTS

DE        10 2007 004 72        8/2008

* cited by examiner

Primary Examiner — Manish S Shah
Assistant Examiner — Yaovi Ameh
(74) Attorney, Agent, or Firm — Schiff Hardin LLP

(57) ABSTRACT

An apparatus includes a number of apparatus components that are operable to produce an apparatus action. The components include a circuit board that is available for installation in a number of different board variants. Each circuit board variant includes a photoelectric barrier that receives an input signal from a controller of the apparatus, and that generates a photoelectric barrier output signal supplied to the controller. At least one of the circuit board variants includes a delay element that introduces a delay into the output signal from the controller that is supplied to the photoelectric barrier. The delay is matched to the particular variant of the circuit board, so that the controller, by detecting a characteristic of the delay, can identify the circuit board variant of the currently-installed circuit board. The controller then controls the components to produce the apparatus action dependent on the variant of the currently installed circuit board.

14 Claims, 2 Drawing Sheets

APPARATUS USABLE WITH DIFFERENT CIRCUIT BOARD VARIANTS, WITH DETECTION OF CURRENTLY-INSTALLED VARIANT

BACKGROUND OF THE INVENTION

1. Field of the Invention

The present invention concerns an apparatus having controlled components that are operated in order to produce an apparatus action, wherein the control of the components is dependent on which circuit board, among a number of different circuit board variants, is currently present in the apparatus.

The invention more specifically concerns a printing apparatus of the type using an inkjet printing device and a controller that controls printing, as an apparatus action. Such a printing apparatus is suitable for use in franking machines, addressing machines and other mail processing devices.

2. Description of the Prior Art

An inkjet printing device is equipped in a known manner with an inkjet printing module and a transport device that has a transport belt in order to transport flat items to be printed in a transport direction past the printing module. A pressing device presses the flat item onto the transport belt. The inkjet printing module has a printing carriage, an electronic control unit, and at least one ink cartridge or at least one inkjet print head that is positioned stationary in a printing position over the transport path during the printing. The printing carriage can be moved transversely to the transport direction before or after the printing for maintenance or to exchange the at least one ink cartridge or the at least one inkjet print head. The printing apparatus has a sensor circuit board with sensors in order to detect the achieved position during the transverse movement of the printing carriage.

From published European Patent EP 1 300 807 B1, a method and an arrangement for opening a security housing are known that, in one embodiment, has a flap that can be opened at any time in order to allow a limited access to an opening for exchanging the ink cartridge. A cover of the electronic control unit of the printing module and of the control circuits of the electronic control unit serves to protect against tampering of the franking machine via the opening. The opening can be sealed by the flap. The flap is equipped with a stop that activates a switch upon opening the flap, this switch being arranged inside the security housing. The switch interrupts the power supply of a motor of the transverse movement mechanism of the printing module in order to avoid accidents due to the transverse movement of the printing module occurring while the flap is open. Even when the transversely movable printing module has been moved into the printing position or into a position outside of the printing position, the flap remains unlocked and can be opened. However, the printing module must be moved into an exchange position situated between the printing position and one of the other positions in order to exchange an ink cartridge that is then positioned in the region of an opening. Due to the situation of the exchange position being between the printing position and one of the other positions, an additional protection of the electronic control unit of the printing module and of the control circuits of the electronic control unit is necessary, which is costly in terms of materials.

A printing apparatus of modular design, with a removable, box-shaped module, is known from published German Patent Application DE 20 2010 015 354 A1. The apparatus is likewise equipped with at least one inkjet print head to print on flat items during the passage of the flat items through the apparatus. The inkjet print head is moved by a printing carriage into a printing position for printing. A sensor is arranged at a frame wall of the apparatus housing. This sensor signals to a microprocessor controller that a sealing position has been reached given movement of the printing carriage out of the printing position. The sensor can be realized as a photoelectric barrier. The printing carriage of the printing apparatus thereby likewise executes an orthogonal movement relative to the transport direction of the flat items.

A device to exchange ink cartridges of a printing device is known from published European Patent Application EP 2073173 A1. The printing device described therein has a transport direction for flat items, a pressure device, and a printing module, with the printing module arranged stationary in the printing device relative to a pressure device, which presses the flat item onto a transport belt, which, in the transport region, acts with a predetermined stiction on a surface portion of the flat item. Printing does not take place on this surface portion but it is situated close to the region that is to be printed. An exchange position for ink cartridges is located over or in front of the transport region of the transport direction. The alignment of the ink cartridge in the printing module is such that its underside faces forward (thus toward the front side of the printing apparatus). A cartridge flap that seals the opening for the exchange cannot be opened when the ink cartridge is not located in the exchange position. By making the location of the exchange position near the front side of the printing apparatus (thus in front of all other positions), no additional protection of the electronic control unit of the printing module and the control circuits of the electronic control unit is required.

It is generally desirable that the production of a functional printing apparatus should be enabled using housing parts that have a greater tolerance range. In the above-described printing device, for example, the cartridge flap detection switch may not be triggered with certainty due to tolerance build-up of the assembled parts. A first design of an apparatus variant A therefore had to take place with parts that have only a slight tolerance, which made the production of the printing apparatus more expensive. A design of an apparatus variant B enables the use of parts with larger tolerance. A number of software variants, respectively appropriate for the different variants A and B are already loaded into the memory of the controller during the production of this printing apparatus. Selection (from the memory) and use of the software matched to the actual apparatus variant must take place, but it would be desirable to do so without needing to make a change to the hardware of the controller.

SUMMARY OF THE INVENTION

An object of the invention is to provide a printing apparatus that has a sensor circuit board with at least one transmitted light barrier that signals to a mainboard processor of the controller whether the printing carriage is located in a position in the region of said transmitted light barrier or not.

To differentiate apparatus variants, the printing apparatus according to the invention has a sensor circuit board with at least one photoelectric barrier and with a low-pass filter to delay an input signal to the photoelectric barrier that is delivered from an output of the controller, with the delay matched to the respective apparatus variant. The controller has an FPGA that forms a workflow controller in order to determine whether there is a delay in the timing of the receptacle and the controller of the output signal from the photoelectric barrier of the sensor circuit board, after a predetermined duration following the delivery of the input signal to the photoelectric barrier from the controller.

The physical location of the light barrier on the sensor circuit board contributes to the determination of the position of the printing carriage. A vane that interrupts the light beam of the photoelectric barrier when a corresponding position is achieved in the travel of the printing carriage is molded on the printing carriage.

At least one transmitted light barrier for the detection of one of the various printing carriage positions is located at the sensor circuit board. For use in apparatus variants other than a first apparatus variant, the position of the photoelectric barrier is geometrically modified in comparison to the position of the photoelectric barrier on the sensor circuit board used in the first apparatus variant. For example, if the transport direction of the flat items to be printed is in the x-direction of a Cartesian coordinate system, the position of the photoelectric barrier can be shifted in the y-direction. The sensor circuit board is advantageously mounted at a frame wall of the printing apparatus so as to be easily exchangeable. One photoelectric barrier on the sensor circuit board is located near the rear housing wall (back), and another (upon whose triggering the printing position is reached) is located further forward. This additional photoelectric barrier is shifted by a few mm on the sensor circuit board for the apparatus variant B relative to the sensor circuit board for the apparatus variant A, in order to ensure more certainty for the triggering of the cartridge flap detection switch, even given large tolerance build-up. In accordance with the invention, the circuit arrangement of the sensor circuit board, namely the arrangement of a low-pass filter on the sensor circuit board used for the apparatus variant B, makes it possible to detect the respective sensor circuit board that is in use, and since the signal delay introduced by the low-pass filter is matched to an apparatus variant, such as the apparatus variants A or B noted above, an FPGA, or software in the mainboard processor of the controller automatically "knows" which variant exists, so that the precise position of the printing carriage can be determined with the sensor for the printing position in any (in this case both) of the apparatus variants. It is additionally possible to establish even more apparatus variants without incurring a hardware cost due to an additional sensor.

Different variants were developed for the sensor circuit board, with a specific software version being associated with each of the variants. Known defects in the functioning of the printing apparatus that occurred during production thus can be remedied by the use of a corresponding sensor circuit board and an associated software version.

DESCRIPTION OF THE PREFERRED EMBODIMENTS

Figure 1:
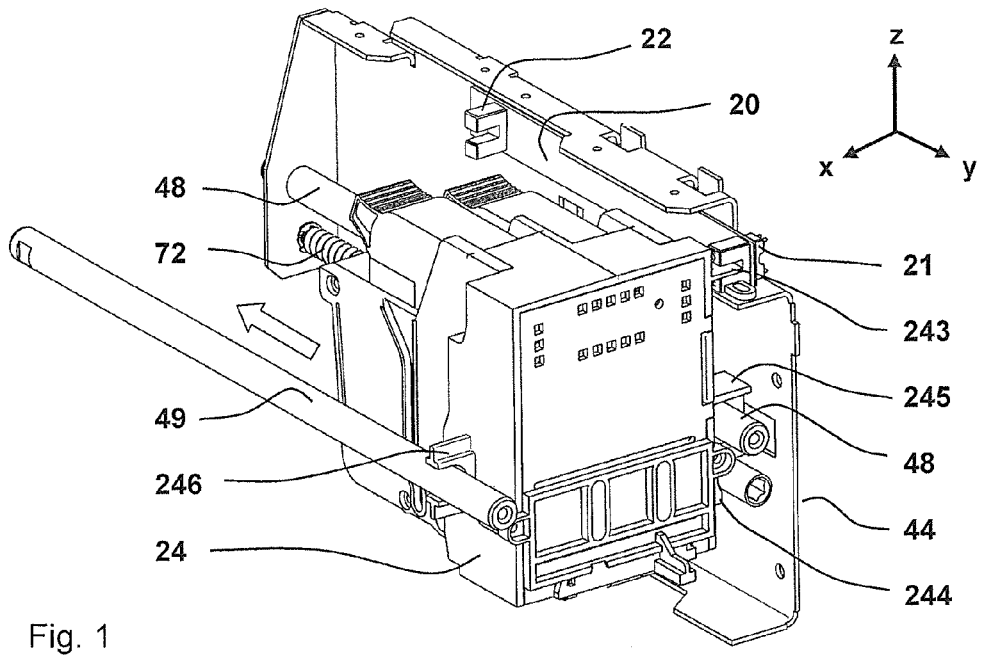
FIG. 1 is a perspective view of a portion of a printing apparatus in accordance with the invention from the rear left in service mode, with the printing carriage in the sealing position and with a transmitted light barrier that is activated by the printing carriage.

FIG. 1 is a perspective view of a portion of a printing apparatus from the rear left. In the service mode of the printing apparatus, the printing carriage 24 is located in a sealing position in which a first transmitted light barrier 21 is activated by the printing carriage 24. A vane 243 that interrupts the light beam of the transmitted light barrier 21 when the sealing position is reached is molded on the printing carriage 24. The printing carriage 24 is mounted so as to be displaceable back and forth in the y-direction of the shown Cartesian axes on two rails 48 and 49. A shaft 72 serves to drive the printing carriage 24 and is arranged below the rail 48, thus counter to the z-direction. A slide bearing 245 and another similar slide bearing (not visible), as well as a shaft nut 244, are molded on the right side wall (as seen from the rear) of the printing carriage 24, thus on that side that is nearest the second frame wall 44 of the chassis. An additional slide bearing 246 is molded on the left side wall of the printing carriage 24 that is situated opposite the right side wall. The displaceable printing carriage 24 is thus supported at three points. The slide bearing 246 slides on the rail 49, and the slide bearing 245 and the other slide bearing slide on the rail 48. The slide bearings are adapted to the profile of the rails. The rails are designed as slide rails and have a rounded (advantageously circular) profile. The printing carriage 24 in FIG. 1 is shown moved into the sealing position and can be driven in the direction of the white arrow (in the negative y-direction) into a printing position, and further into a cartridge exchange position. The printing carriage 24 moves out of the sealing position ("back"), over the printing position ("forward") up to the cartridge exchange position ("all the way forward"), in which the aforementioned flap (not shown) is opened.

The vane 243 molded on the printing carriage interrupts the light beam of a second transmitted light barrier 22 when the printing position is reached. Both transmitted light barriers 21 and 22 are arranged at a predetermined interval (spacing from each other) on a sensor circuit board 20. This predetermined interval is determined essentially by the distance of the sealing position from the printing position in the y-direction. The sensor circuit board 20 is mounted on the frame wall 44 so that it can easily be exchanged.

Figure 2:
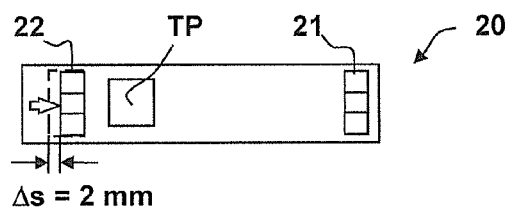
FIG. 2 is a plan view of the sensor circuit board for an apparatus variant B.

FIG. 2 shows a plan view of the sensor circuit board for an apparatus variant B. The sensor circuit board 20 has a low-pass filter between the transmitted light barriers 21 and 22 that are spaced apart from one another, with the transmitted light barrier 22 being offset by the distance $\Delta s=2$ mm in the direction of the transmitted light barrier 21 (compared to the position it would occupy on a sensor board designed for use in apparatus variant A). The increased tolerance values of the apparatus variant B are addressed by this offset. This geometric modification requires a software change. The controller is informed of the required software version with by the low-pass filter, namely by the signal delay caused by the low-pass filter.

Due to each of the variants of the circuit arrangement of the sensor circuit board 20, in particular a variant imparted by the low-pass filter and the signal delay caused thereby, a predetermined software adapted to the apparatus variant can be selected and called by the mainboard processor of the controller in order to operate the printing apparatus.

Figure 3:
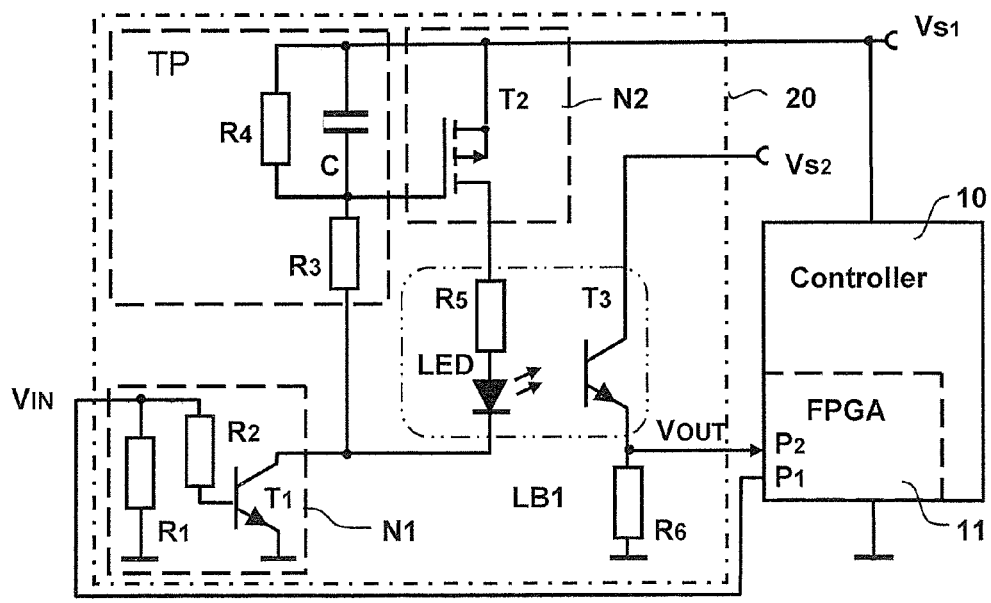
FIG. 3 shows the circuit arrangement with a photoelectric barrier according to the invention.

Using a circuit arrangement (shown in FIG. 3) with a photoelectric barrier, the functioning thereof is explained in detail. Two ohmic resistors R1 and R2 are connected in series and form a voltage divider that is connected between ground potential (L-level) and the base of a first npn-transistor T1, the emitter of which is at ground potential. The connection point of the resistors R1 and R2 forms the input of the circuit of the sensor circuit board 20. A field programmable gate array (FPGA) 11 delivers the signal $V_{IN}$ to the input via a pin P1. The transistor T1 forms a first negator (inverter or NOT-element) N1 for the signal. Its output is at the collector of the transistor T1. A low-pass filter TP is connected between the output and a first supply voltage Vs1. The low-pass filter TP is formed by the two ohmic resistors R3 and R4 that are connected in series and a capacitor C that has a predetermined capacitance in order to accordingly delay the input signal at the control input of a controllable switch, the input resistance of which control input is high. The switch is advantageously a field effect transistor T1 (for example of the type SI2333DS) that can be switched on given a low level applied between L-level and H-level. The capacitor C is connected in parallel with the resistor R4 and is connected with one terminal to the first supply voltage Vs1=5 V and with the other terminal to the interconnection point of the resistors R3 and R4. The gate terminal of the field effect transistor is at the interconnection point of the resistors R3 and R4. The field effect transistor T2 is a P-channel accumulation-type FET. The source terminal of the field effect transistor T2 is wired to the supply voltage Vs1. A photoelectric barrier LB1 comprises a photoemitter and a photoreceiver. An infrared photodiode LED connected to the drain terminal of the field effect transistor T2 via a resistor R5 is used at the emitter side, which infrared photodiode LED is activated by a controller 10 via the input of the circuit arrangement of the sensor circuit board 20. For example, the LED is switched on given an L/H level change of the signal $V_{IN}$. Alternatively, it can be pulsed. Located at the receiver side is a phototransistor T3 in a collector circuit whose collector is connected with a second supply voltage Vs2=3 V. The output signal $V_{OUT}$ is variable depending on the state of the photoelectric barrier (FIG. 4) and is tapped via an emitter resistor R4 that is connected between the emitter and ground potential. The output is connected with the pin P4 of an FPGA 11 that acts as an input and output circuit of the controller 10. The photoelectric barrier LB1 is open when the light beam of the LED is not interrupted.

The photoelectric barrier is closed when the light beam of the LED is interrupted.

Figure 4:
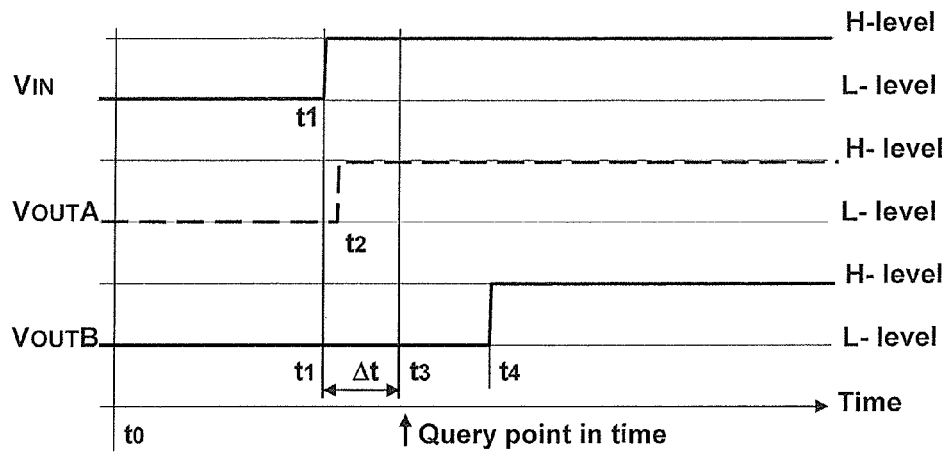
FIG. 4 shows the time change of the signal level curve for two different apparatus variants.

The time change of the level curve for two different apparatus variants is shown in FIG. 4. The input signal VIN changes its level from low (L-level) to high (H-level) at the point in time t1. In the apparatus variant A, there exists only a slight delay for the output signal $V_{OUTA}$ of the sensor circuit board 20, which appears at the point in time t2. In contrast to this, in the apparatus variant B a larger delay exists for the output signal $V_{OUTB}$ of the sensor circuit board 20 which appears at the point in time t4.

Figure 5:
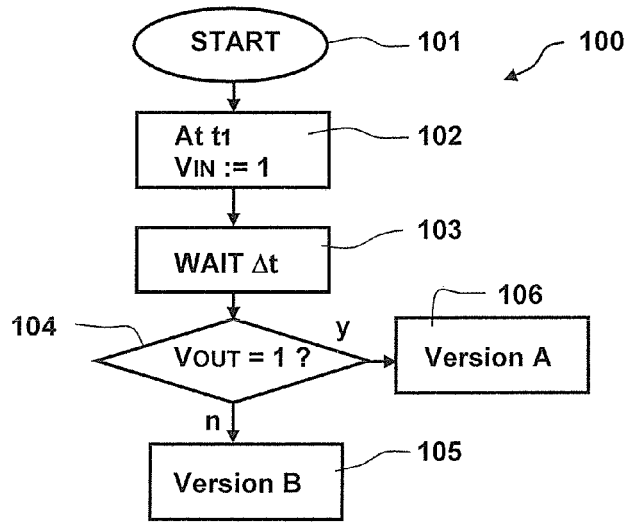
FIG. 5 explains the query by the controller using a flow chart.

FIG. 5 serves to explain the query by the controller using a flow chart 100. After the start 101, an output of the signal $V_{IN}$ with an L/H level change takes place at the point in time t1 in Step 102. In Step 103 a time period Δt is subsequently waited before the level is measured. In the query step 104 it is established whether an H-level is present, i.e. logic level=1.

If this is not the case, the apparatus variant B is present and an associated user program is loaded (Step 105). Otherwise, the apparatus variant A is present and an associated user program is loaded (Step 106).

Figure 6:
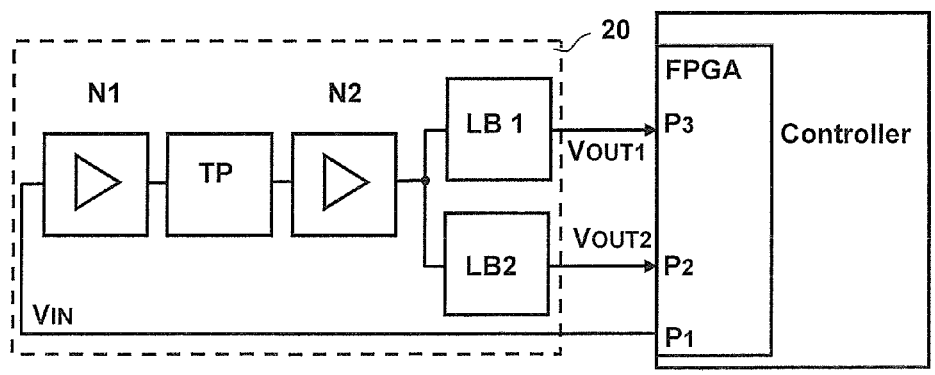
FIG. 6 is a block diagram of a circuit for a sensor circuit board with two photoelectric barriers according to the invention.

FIG. 6 shows a block diagram of a sensor circuit board 20 with two photoelectric barriers according to the invention. An output of the FPGA is at pin P1 and delivers the signal $V_{IN}$. The aforementioned signal arrives at the input of a second negator N2 via a first negator N1 and a low-pass N2. Its field effect transistor T2 operates as an impedance converter. Therefore, two photoelectric barriers (advantageously of type TCST1103) can be connected. Its output signal $V_{OUT1}$ or, respectively, $V_{OUT2}$ arrives at the pins P3 or, respectively, P2 of the FPGA.

The vane molded on the printing carriage—which vane interrupts or does not interrupt the beam path of the photoelectric barrier depending on the position of the printing carriage—has a geometry that can never simultaneously interrupt both photoelectric barriers. Additional signal lines for coding are not provided, nor is such a thing necessary. Only the existing circuits are necessary. Based on the realization that at least one of the two photoelectric barriers naturally remains open, independent of where the print head carriage is situated, the controller now activates a workflow control operating in the FPGA for variant detection and checks whether H-level (i.e. the "open" signal) appears with a time delay at the output of at least one of the photoelectric barriers. The light beam thus arrives at the phototransistor of the photoelectric barrier LB1 or LB2, and said phototransistor outputs a signal $V_{OUT1}$ or the signal $V_{OUT2}$.

In variant A, "open" appears immediately at at least one photoelectric barrier, which means apparatus variant A with an "old" sensor circuit board.

In variant B, "open" appears at at least one photoelectric barrier only after a defined time Δt, which means "new circuit board". This behavior is achieved at the "new" circuit board via a time delay element (RC element) which only disconnects the LED current with a delay via the transistor.

The modified circuit of a sensor circuit board contributes to the determination of the position of the printing carriage. Molded on the printing carriage is a vane that interrupts the light beam of a photoelectric barrier when a corresponding position is reached upon movement of said printing carriage. The comparison of signal changes at the output of the transmitted light barrier is executed in a separate comparator that is realized by means of an FPGA. The FPGA is a component of the control and is connected to the output of the receiver unit.

Alternatively, for apparatus variants A and B, the detection of the sensor circuit board can also take place automatically in software via a mainboard processor of the controller.

The mainboard processor of the controller is programmed in order to load an associated user program for each apparatus variant.

Although modifications and changes may be suggested by those skilled in the art, it is the intention of the inventors to embody within the patent warranted hereon all changes and modifications as reasonably and properly come within the scope of their contributions to the art.

We claim as our invention:

1. An apparatus comprising:
    a plurality of apparatus components collectively configured to be operated to produce an apparatus action;
    a controller configured to operate said apparatus components to produce said apparatus action;
    said apparatus components including a circuit board that receives an input signal from said controller and that produces a photoelectric barrier output signal to said controller, said circuit board being configured in one configuration variant among multiple configuration variants of said circuit board, each of said multiple configuration variants requiring a respectively different operation of said apparatus components by said controller in order to produce said apparatus action by said apparatus components;

said circuit board comprising a circuit board input to which said input signal to said photoelectric barrier is supplied from said controller, and a circuit board output at which said photoelectric barrier output signal is supplied to said controller, and comprising a delay element electrically connected between said circuit board input and said photoelectric barrier that introduces a delay into said input signal, said delay being individualized for the respective configuration variant that said circuit board has among said multiple variants; and said controller being configured to detect a characteristic of said delay, selected from the group consisting of an occurrence or non-occurrence of said delay and a magnitude of said delay, and to identify said one configuration variant of said circuit board, among said multiple variants, from the detected characteristic of said delay, and to operate said components according to the operation required for said one configuration variant identified from said characteristic of said delay, to produce said apparatus action dependent on said one configuration variant of said circuit board.

2. An apparatus as claimed in claim 1 wherein said apparatus components include a print head configured to print indicia on an item fed to said print head.

3. An apparatus as claimed in claim 2 wherein said print head is an inkjet print head.

4. An apparatus as claimed in claim 2 wherein said print head comprises a print head element that interacts with said photoelectric barrier, and wherein said controller is configured to utilize said photoelectric barrier output signal to identify a position of said print head.

5. An apparatus as claimed in claim 1 comprising a memory in which a plurality of operating programs are stored, and wherein said controller is configured to access said memory to select and load one of said operating programs, and to operate said apparatus components using said one of said programs, dependent on said one configuration variant of said printed circuit board.

6. An apparatus as claimed in claim 1 wherein said controller comprises a freely programmable gate array (FPGA) configured to emit said input signal and to receive said photoelectric barrier output signal, and to detect said delay characteristic.

7. An apparatus as claimed in claim 1 wherein said delay element is a low-pass filter.

8. An apparatus as claimed in claim 6 wherein said circuit board comprises a first inverter connected between said circuit board input and said low-pass filter, and a second inverter connected between said low-pass filter and said photoelectric barrier.

9. A printing apparatus as claimed in claim 6 wherein said photoelectric barrier is a first photoelectric barrier and wherein said circuit board output is a first circuit board output, and wherein said circuit board comprises a second photoelectric barrier and a second circuit board output at which said second photoelectric barrier supplies a further photoelectric barrier output signal to said controller, and wherein said circuit board comprises a first inverter connected between said board input and said low-pass filter, and a second inverter connected between said low-pass filter and each of said first and second photoelectric barriers.

10. A method for operating an apparatus that comprises a plurality of apparatus components collectively configured to be operated to produce an apparatus action, and a controller configured to operate said apparatus components to produce said apparatus action, said method comprising:

providing, among said apparatus components, a circuit board that receives an input signal from said controller and that produces a photoelectric barrier output signal to said controller, said circuit board being configured in one configuration variant among multiple configuration variants of said circuit board, each of said multiple configuration variants requiring a respectively different operation of said apparatus components by said controller in order to produce said apparatus action by said apparatus components;

providing said circuit board with a circuit board input to which said input signal to said photoelectric barrier is supplied from said controller, and a circuit board output at which said photoelectric barrier output signal is supplied to said controller, and a delay element electrically connected between said circuit board input and said photoelectric barrier that introduces a delay into said input signal, said delay being individualized for the respective variant that said circuit board has among said multiple variants; and in said controller, detecting a characteristic of said delay, selected from the group consisting of an occurrence or non-occurrence of said delay and a magnitude of said delay, and identifying said one configuration variant of said circuit board, among said multiple variants, from the detected characteristic of said delay, and operating said components from said controller according to the operation required for said one configuration variant identified from said characteristic of said delay, to produce said apparatus action dependent on said one configuration variant of said circuit board.

11. A method as claimed in claim 10 wherein said apparatus components include a print head, and comprising operating said apparatus components to print indicia on an item fed to said print head, as said apparatus action.

12. A method as claimed in claim 10 wherein said print head comprises a print head element that interacts with said photoelectric barrier and comprising, in said controller, utilizing said photoelectric barrier output signal to identify a position of said print head.

13. A method as claimed in claim 10 comprising storing a plurality of operating programs in a memory, and accessing said memory from said controller to select and load one of said operating programs, and operating said apparatus components using said one of said programs, dependent on said one configuration variant of said printed circuit board.

14. A method as claimed in claim 10 comprising forming said delay element as a low-pass filter.

* * * * *